United States Patent [19]

Mussler et al.

[11] Patent Number: 4,710,758
[45] Date of Patent: Dec. 1, 1987

[54] AUTOMATIC TOUCH SCREEN CALIBRATION METHOD

[75] Inventors: James M. Mussler, Bethel Park; Mark E. Swartz, Monroeville, both of Pa.

[73] Assignee: Westinghouse Electric Corp., Pittsburgh, Pa.

[21] Appl. No.: 727,966

[22] Filed: Apr. 26, 1985

[51] Int. Cl.$^4$ ............................................. G09G 3/00
[52] U.S. Cl. ................................ 340/712; 340/719; 340/724; 340/571; 178/18
[58] Field of Search ............... 340/712, 711, 365 C, 340/365 R, 709, 719, 724; 178/18; 364/571; 342/174

[56] References Cited

U.S. PATENT DOCUMENTS

| | | |
|---|---|---|
| 3,668,654 | 1/1972 | Doersam, Jr. |
| 3,873,770 | 3/1975 | Ioannou ............................ 178/18 |
| 3,875,331 | 4/1975 | Hasenbalg ......................... 178/18 |
| 3,995,269 | 11/1976 | Schumacher . |
| 3,997,891 | 12/1976 | Iwamura et al. |
| 4,009,338 | 2/1977 | Dym et al. ........................ 178/18 |
| 4,267,443 | 5/1981 | Carroll et al. |
| 4,286,289 | 8/1981 | Ottesen et al. |
| 4,295,135 | 10/1981 | Sukonick . |
| 4,305,135 | 12/1981 | Dahl et al. |
| 4,317,005 | 2/1982 | de Bruyne ........................ 178/18 |
| 4,346,376 | 8/1982 | Mallos . |
| 4,384,201 | 5/1983 | Carroll et al. |
| 4,386,232 | 5/1983 | Slater . |
| 4,386,346 | 5/1983 | Levine . |
| 4,389,711 | 6/1983 | Hotta et al. |
| 4,396,977 | 8/1983 | Slater et al. |
| 4,413,314 | 11/1983 | Slater et al. |
| 4,424,572 | 1/1984 | Lorig et al. |
| 4,432,360 | 2/1984 | Mumford et al. |
| 4,442,317 | 4/1984 | Jandrell . |
| 4,444,998 | 4/1984 | House . |
| 4,476,463 | 10/1984 | Ng et al. |
| 4,514,688 | 4/1985 | Whetstone ........................ 178/18 |
| 4,553,091 | 11/1985 | Bristol ............................. 364/571 |
| 4,577,057 | 3/1986 | Blesser ............................ 178/18 |

FOREIGN PATENT DOCUMENTS

| | | | |
|---|---|---|---|
| 0586474 | 12/1977 | U.S.S.R. ........................... 178/18 |
| 0613359 | 6/1978 | U.S.S.R. ........................... 178/18 |

Primary Examiner—Gerald L. Brigance
Assistant Examiner—Mahmoud Fatahiyar
Attorney, Agent, or Firm—Daniel C. Abeles

[57] ABSTRACT

A method for automatically calibrating a touch screen used in conjunction with a graphic display is executed prior to every interactive session. Three points, defining perpendicular axes, are displayed and an operator is instructed to touch the touch screen at each of the points in succession. Coordinates for the three points output by the touch screen are checked for reasonableness and perpendicularity. If these checks are passed, a coordinate translation matrix is generated for converting touch screen coordinates into display coordinates.

17 Claims, 4 Drawing Figures

AUTOMATIC TOUCH SCREEN CALIBRATION METHOD

BACKGROUND OF THE INVENTION

1. Field of the Invention

The present invention relates in general to a method of calibrating a touch screen used in conjunction with a display such as a cathode ray tube (CRT); and more particularly, to a method for automatically calibrating a CRT touch screen prior to each session during which the touch screen is used.

2. Description of the Related Art

The use of a touch screen overlaying a CRT screen is well known for inputting data into a computer. Such touch screens are substantially transparent and may include a net of wires or conductive plastic or utilize ultrasonic or photo-detectors at the edges of the screen. Since the purpose of such touch screens is to detect the location of a finger or other object disposed in proximity to an area on the CRT display, it is necessary for the computer receiving data from a touch screen to know the correspondence between the display and the touch screen. Therefore, it is necessary to calibrate the coordinates output by the touch screen with the coordinates of points on the display.

A conventional method for establishing the correspondence between a display and a touch screen is described in U.S. Pat. No. 4,442,317 to Jandrell. Two techniques are described in Jandrell. The first technique utilizes a pair of scaling and offset amplifiers in each of the horizontal and vertical directions to adjust the output of the touch screen to match that of the display. The second technique is used in the case of non-uniform electric fields and is based on mapping between display positions and probe potentials. In both cases, it is necessary for manual adjustments to be performed, either to the scaling and offset amplifiers or to establish the mapping between the touch screen and the displayed data.

After a touch screen has been calibrated as described in Jandrell, the calibration operator can be expected to properly input data using the touch screen. However, studies have been performed which indicate that different people tend to touch the screen of a display at different locations when selecting the same area on the CRT. For example, someone seated below the screen may consistently touch the bottom of a displayed symbol, while someone standing above the screen may consistently touch a higher point. Similarly, one person may touch to the left and another to the right of a symbol. Therefore, it is desirable to make some allowance for individual variation in interaction with a touch screen overlaying a computer display.

One solution to the problem of individual variance is described in U.S. Pat. No. 4,396,977 to Slater et al. The solution in Slater et al. is to provide feedback to an operator to indicate the position detected as having previously been touched. A two step process is used in the case of critical inputs in which the first step involves selecting a command by touching one of the options displayed on the screen and the second step involves touching another area on the screen to execute the command selected. This method requires that the feedback routines and two step selection process be used in every program utilizing the touch screen input. In addition, there is no allowance for a severely misaligned touch screen which would require an operator to remember not to touch a desired symbol but to touch the next symbol to the right, for example. In other words, this method results in the training of an operator rather than the "training" or calibration of the equipment.

SUMMARY OF THE INVENTION

An object of the present invention is to provide a method for improving the accuracy of input on a touch screen overlaying a graphic display.

Another object of the present invention is to provide an automatic touch screen calibration method which is performed at the beginning of an operator session and does not require any specialized procedures in subsequent data input routines.

A further object of the present invention is to provide an automatic touch screen calibration method which adapts to the idiosyncracies of each individual operator.

Another object of the present invention is to provide an automatic touch screen calibration method which can be used with a variety of touch screens having different coordinate ranges and formats.

Yet another object of the present invention is to provide an automatic touch screen calibration method which detects severe misalignment of a touch screen and an associated display.

The above objects are provided by an automatic touch screen calibration method comprising the steps of displaying, prior to each interactive session, a first point on a display; obtaining first coordinates of a first touch on the touch screen at the first point; and generating a translation matrix for translating the coordinates of the first touch into display coordinates. Preferably, the method includes displaying second and third points on the display and obtaining second and third coordinates of second and third touches at the second and third points, respectively. When the first, second and third coordinates of all three points have been obtained, the translation matrix is preferably generated in dependence upon the first, second and third coordinates. In addition, the first, second and third points preferably define perpendicular axes and the automatic touch screen calibration method includes verifying that an angle defined by the first, second and third coordinates is substantially equal to 90° and that the coordinates lie within predetermined ranges.

These objects, together with other objects and advantages which will be subsequently apparent, reside in the details of the construction and operation as more fully hereinafter described and claimed, reference being had to the accompanying drawings forming a part hereof, wherein like reference numerals refer to like parts throughout.

DESCRIPTION OF THE PREFERRED EMBODIMENTS

As the reliability of touch screen input devices improves, this method of input may be expected to be more widely used since no training is required to learn how to use such input devices. Thus, the computer user is not required to be a proficient typist or know how to use a "mouse" input device. In addition, while the terms CRT and display are used interchangeably in describing this embodiment, it is known that touch screens can also be used with plasma and rear-projection displays, etc. The present invention can be used to calibrate or map any type of touch screen overlay with virtually any type of display.

Figure 1:
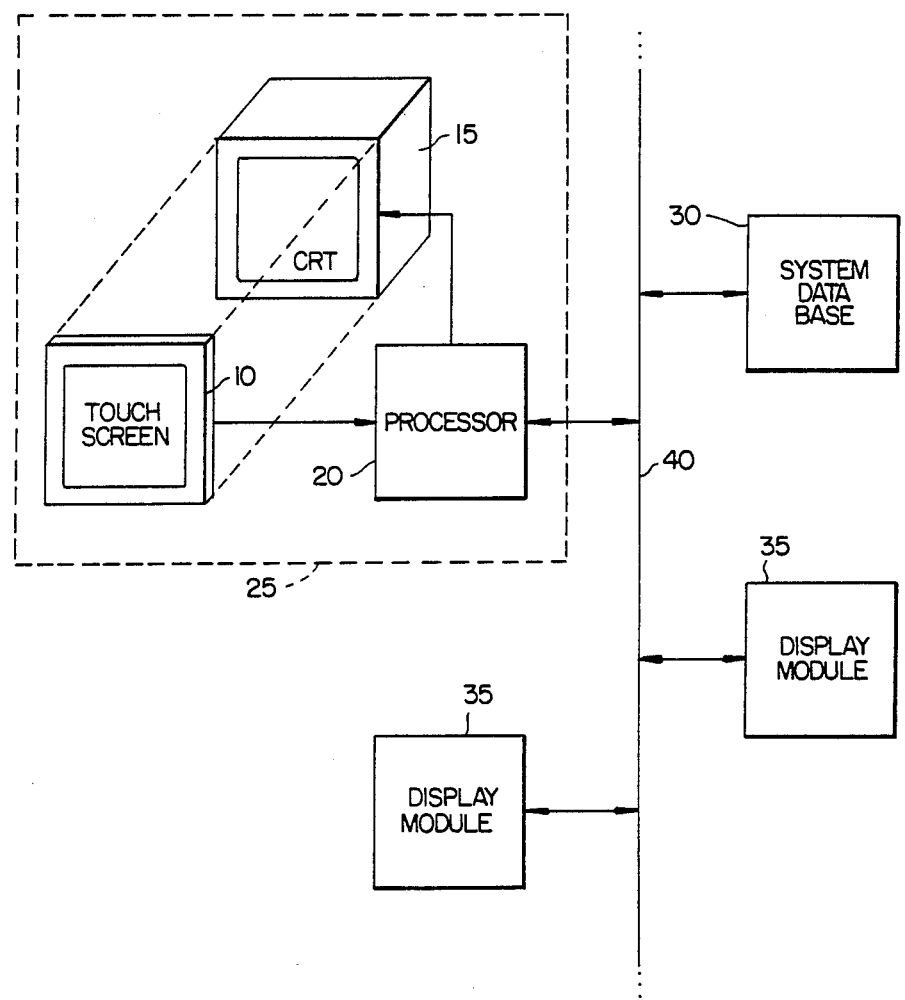
FIG. 1 is a block diagram of a computer system to which the present invention can be applied.

A typical device using a touch screen is illustrated in FIG. 1. In FIG. 1, a touch screen overlay 10 is mounted on a CRT 15 and both are connected to a processor 20 within a display module 25. The processor 20 within the display module 25 may be connected to a system data base 30 along with other display modules 35 via a bus 40. Other devices (not shown) may also be connected to the bus 40, such as a mainframe computer, input/output devices or process control equipment. The computer system illustrated in FIG. 1 may be used for applications as diverse as seat reservations on an airplane or in a theatre and process control in a power generating or automated manufacturing plant.

Figure 2:
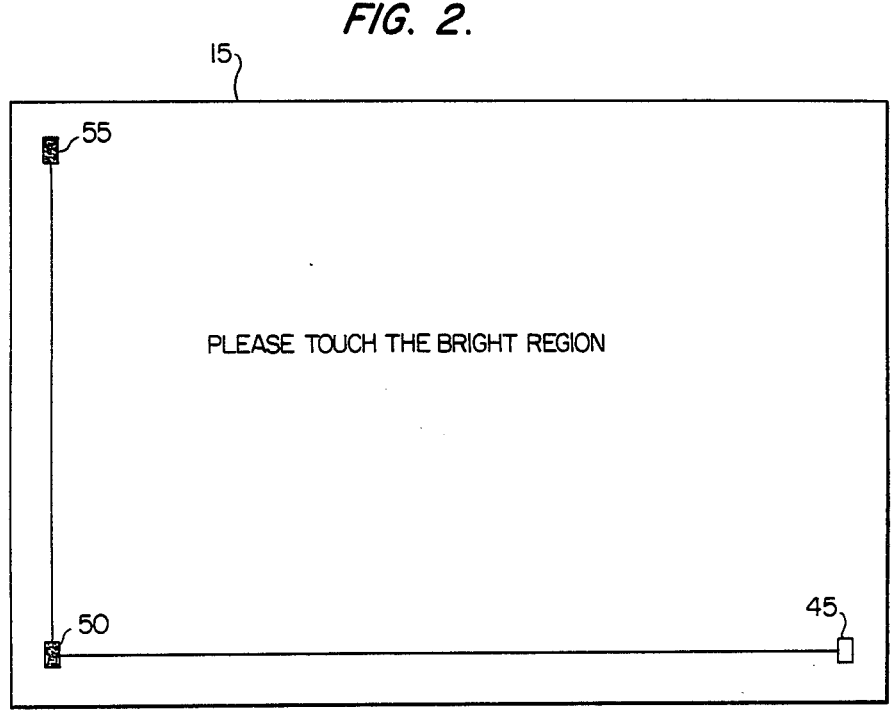
FIG. 2 is a representation of the output displayed during one step of an embodiment according to the present invention.

An embodiment of the present invention begins the process of calibrating a touch screen 10 with a display 15 to allow for an individual's input idiosyncracies by displaying a screen format such as that illustrated in FIG. 2. As illustrated in FIG. 2, three points are displayed on the CRT 15 and a message is displayed on the screen to "PLEASE TOUCH THE BRIGHT REGION". In FIG. 2, block 45 is illustrated as currently being bright and blocks 50 and 55 are illustrated as currently being dark.

As mentioned above, many different types of graphic display terminals 15 and touch screens 10 are known in the art. Anyone who has written a program for a graphic display terminal, with or without the use of packaged graphics software, can be expected to easily display three rectangles on the screen and a short message, as illustrated in FIG. 2. To give a concrete example, a graphics processor (included in processor 20 of FIG. 1) can be used to communicate with application software using the NAPLPS standard described in ANSI standard X3.110-1983 published by the American National Standards Institute, Inc. The preferred embodiment utilizes at least two, and preferably three, levels of subroutines to separate those routines which are unique to the NAPLPS standard and those which could be used with any graphics and touch screen software. The subroutines which are unique to NAPLPS in the preferred embodiment include a subroutine which transmits NAPLPS commands, a routine which selects a texture for a defined area of the screen, a routine which selects a texture pattern, and a routine which defines the boundaries of the rectangle. Other graphics packages might require different types of routines, such as a series of line segments to outline a rectangle or the specification of a single pixel to define a rectangle.

In the preferred embodiment, one or more higher levels of subroutines call the routines which are unique to the NAPLPS standard. Preferably, general drawing routines are available which are designed to be used with different types of graphics terminals and software packages. Thus, the subroutines described above as being unique to NAPLPS include the communication protocol and character values which are required to cause the NAPLPS processor to display corresponding figures such as rectangles on the CRT 15, while the general figure drawing routines call the NAPLPS routines and pass codes which indicate, e.g., what size rectangle to draw or what texture to use. Therefore, another graphic display terminal could be used and only the NAPLPS routines would have to be replaced.

Figure 3:
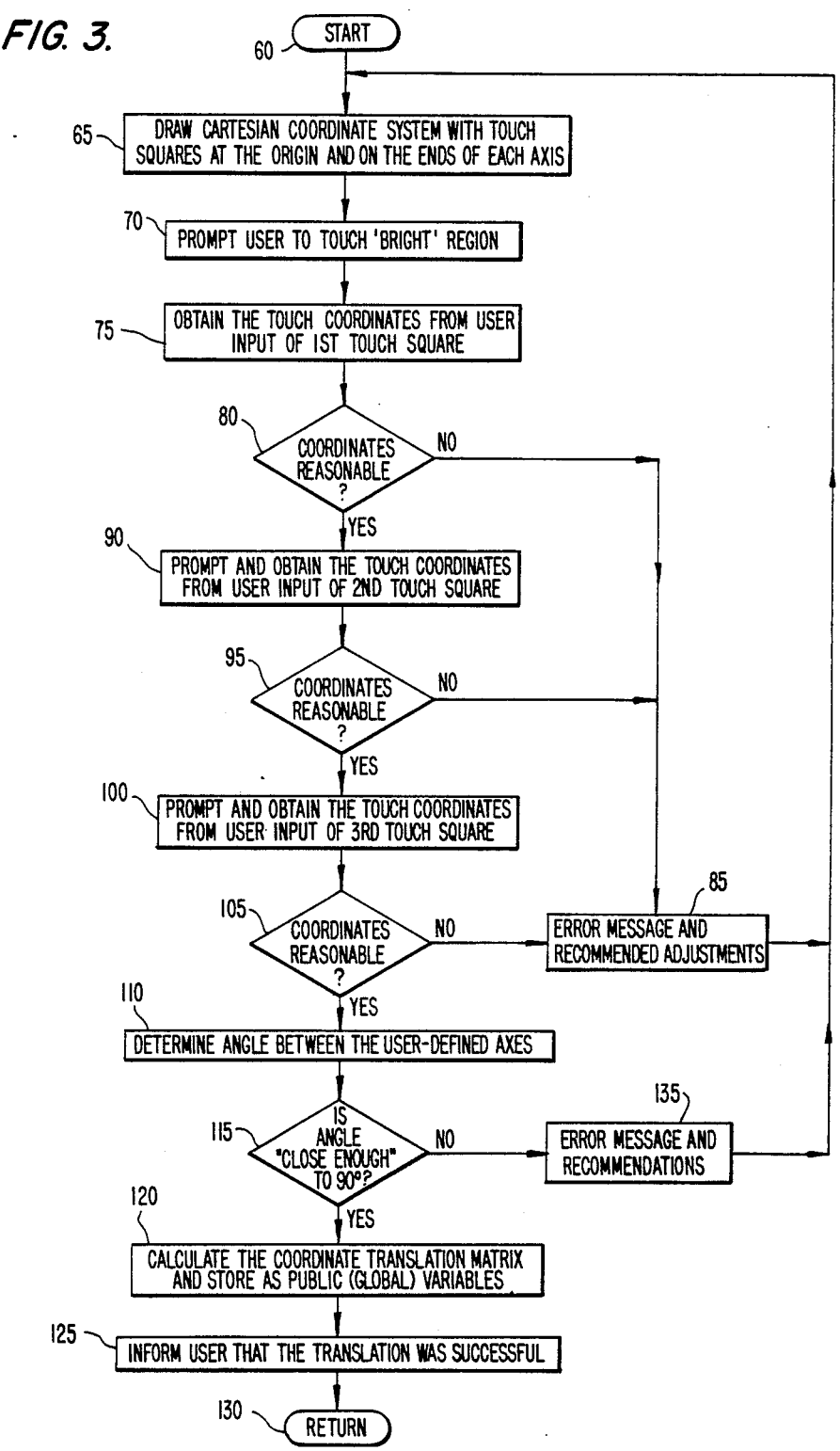
FIG. 3 is a flowchart of an embodiment of the present invention.

A flowchart of an embodiment of a method according to the present invention, which calls the general figure drawing routines, is illustrated in FIG. 3. After initialization in block 60, the screen illustrated in FIG. 2 is created by commands indicated by blocks 65 and 70. When the operator responds to the prompt by touching block 45, the processor 20 can obtain the coordinates of the touch, as indicated by block 75, from the touch screen 10 overlaying the CRT 15.

In block 80, the coordinates are checked to determine whether the touch occurred within an expected touch area. If the touch is outside of the expected touch area, a suitable error is displayed by block 85 on the CRT 15 and the operator is given a new opportunity to touch the screen or perform manual calibration. Thus, if the cause of the error message was operator error, such error can be corrected and if the cause of the error was gross misalignment of the touch screen 10 and CRT 15, the touch screen can be manually calibrated to correct for the error.

Assuming the first touch is within an expected touch area, the first block 45 will be darkened and the second block 50 will become the bright region, as indicated by block 90. When the operator touches the second block 50, the coordinates of the second touch are obtained and checked for reasonablness in block 95 using the check described above for block 80. This procedure is repeated, darkening block 50 and brightening block 55 to prompt and then obtain the coordinates for a third touch in block 100 and the third coordinates are checked for reasonableness in block 105.

Figure 4:
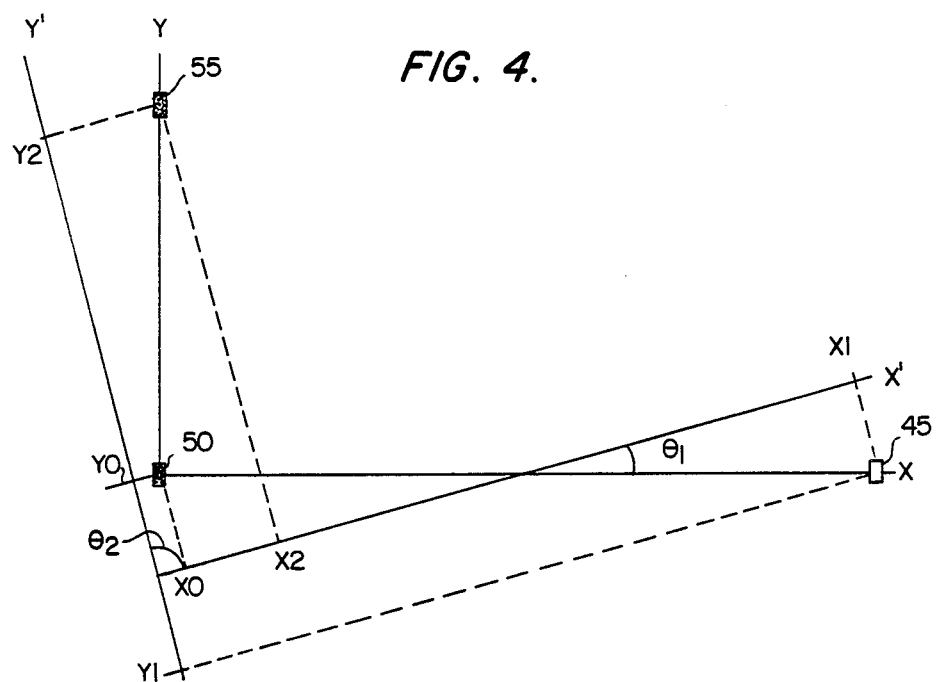
FIG. 4 is a graphical representation of the correspondence between display screen and touch screen axes.

After the three coordinates have been obtained, the angle defined by these three coordinates is preferably calculated (block 110) to determine whether the angle is substantially 90 degrees (block 115), e.g., 75° to 105°. FIG. 4 is a diagram illustrating the relationship between the axes X and Y of the display 15 and the axes X' and Y' of the touch screen 10. It is assumed that the CRT 15 displays the blocks 45, 50 and 55 at a 90° angle. However, the touch screen 10 supplies the coordinates of an operator's touch at blocks 45, 50 and 55 in terms of the coordinates of the X' and Y' axes. These coordinates will be referred to as (X0, Y0) for block 50, (X1, Y1) for block 45 and (X2, Y2) for block 55. Using these coordinates, the angle $\theta_2$ between the X' and Y' axes can be found according to the following equations in which D1 is the distance between blocks 45 and 50, and D2 is the distance between blocks 50 and 55, both in terms of the scale used by the touch screen 10.

$$D1 = \sqrt{(X1 - X0)^2 + (Y1 - Y0)^2} \quad (1)$$

$$D2 = \sqrt{(X2 - X0)^2 + (Y2 - Y0)^2} \quad (2)$$

$$\cos \theta_2 = [(X1 - X0) * (X2 - X0) + (Y1 - Y0) * (Y2 - Y0)]/(D1*D2) \quad (3)$$

If the cos $\theta_2$ is close to zero, then $\theta_2$ is approximately 90°.

If the assumption is made that the X' axis of the touch screen 10 substantially overlies the X axis of the CRT 15 and the Y' axis of the touch screen 10 substantially overlies the Y axis of the CRT 15, then it is sufficient to have the operator touch only a single point. Such a procedure may be possible when the touch screen is installed by the manufacturer of the graphic display unit or the X' and Y' axes are visible on the touch screen 10 and are aligned with the X and Y axes on the CRT 15 when the touch screen 10 is mounted on the CRT 15.

In such a case, it is possible to determine scaling factors in the X and Y directions by having an operator touch a point located a substantial distance from both the X and Y axes. By dividing the X and Y coordinates detected by the touch screen with the X and Y graphic display coordinates, respectively, X and Y coefficients, $X_{coef}$ and $Y_{coef}$, which form two elements of a simplified coordinate translation matrix can be generated as indicated by formulas (4) and (5), where $X_{gd}$ and $Y_{gd}$ are graphic display coordinates and $Y_{ts}$ and $Y_{ts}$ are touch screen coordinates:

$$X_{coef} = X_{gd}/X_{ts} \quad (4)$$

$$Y_{coef} = Y_{gd}/Y_{ts} \quad (5)$$

As a further improvement on this simplified embodiment, the operator may be prompted to touch the origin of the X and Y axes (point 50 in FIG. 4) to generate touch screen coordinates of X0 and Y0 corresponding to X and Y intercepts. Assuming the graphic display coordinates of this point are (0, 0), the following matrix equation results from using a coordinate translation matrix generated from the coordinates input via the touch screen 10, when two points are touched on the touch screen:

$$\begin{bmatrix} X_{gd} \\ Y_{gd} \\ 0 \\ 1 \end{bmatrix} = \begin{bmatrix} X_{coef} & 0 & 0 & X \\ 0 & Y_{coef} & 0 & Y \\ 0 & 0 & 1 & 0 \\ 0 & 0 & 0 & 1 \end{bmatrix} \times \begin{bmatrix} X_{ts} \\ Y_{ts} \\ 0 \\ 1 \end{bmatrix}$$

The preferred embodiment, however, allows for greater variety in misalignment of the touch screen 10 with the CRT 15. In the preferred embodiment, after checking that the coordinates for each of the points is reasonable and the axes X' and Y' are at an angle of approximately 90°, the preferred method according to the present invention calculates a coordinate translation matrix for translating touch screen coordinates into display coordinates using the coordinates of blocks 45, 50 and 55. This step is indicated as block 120 in FIG. 3 and will be described with reference to FIG. 4. As illustrated in FIG. 4, an angle $\theta_1$ is formed between the X' axis of the touch screen 10 and the X axis of the CRT 15. The angle $\theta_1$ is defined by equations (6) and (7):

$$\sin\theta_1 = (Y0 - Y1)/D1 \quad (6)$$

$$\cos\theta_1 = (X1 - X0)/D1 \quad (7)$$

The coordinate translation matrix generated in block 120 preferably stores the relationship between the touch screen coordinates and the display coordinates as a set of ten terms: calib(0) to calib(2) are used for generating an X display coordinate in which the distance from the point 45 to the point 50 is assumed to equal 1; calib(3) to calib(5) are used to generate a Y coordinate that assumes the distance between the point 50 and 55 equals 1; X and Y scale factors are stored in calib(6) and calib(7), respectively, which can be multiplied times the X and Y coordinates generated by calib(0) to calib(5); and calib(8) and calib(9) in which the X and Y coordinates of point 50 are stored, respectively, which allow for a difference between the assumed coordinates (0, 0) and the actual coordinates of point 50.

The values of the coordinate translation matrix generated in block 120 are set forth below in equations 8-17.

$$calib(0) = \cos\theta_1/D1 \quad (8)$$

$$calib(1) = -\sin\theta_1/D1 \quad (9)$$

$$calib(2) = -calib(0)*X0 + calib(1)*Y0 \quad (10)$$

$$calib(3) = \sin\theta_1/D2 \quad (11)$$

$$calib(4) = \cos\theta_1/D2 \quad (12)$$

$$calib(5) = calib(3)*X0 - calib(4) \times Y0 \text{ tm } (13)$$

calib(6) = a third distance D3 distance from point 50 to 45 in graphic display coordinates (14)

calib(7) = a fourth distance D4 from point 50 to 55 in graphic display coordinates (15)

calib(8) = graphic display X coordinate of point 50 (16)

calib(9) = graphic display Y coordinate of point 50 (17)

Once the coordinate translation matrix has been generated in block 120, subsequent application routines can use the coordinate translation matrix to generate normalized X and Y coordinates as indicated below.

$$\begin{bmatrix} X_N \\ Y_N \\ 0 \\ 1 \end{bmatrix} = \begin{bmatrix} calib(0) & calib(1) & 0 & calib(2) \\ calib(3) & calib(4) & 0 & calib(5) \\ 0 & 0 & 1 & 0 \\ 0 & 0 & 0 & 1 \end{bmatrix} \times \begin{bmatrix} X_{ts} \\ Y_{ts} \\ 0 \\ 1 \end{bmatrix}$$

Then, the actual display coordinates can be generated according to the following formulas (16) and (17).

$$X_{gd} = calib(6)*X_N + calib(8) \quad (18)$$

$$Y_{gd} = calib(7)*Y_N + calib(9) \quad (19)$$

Following the generation of the coordinate translation matrix, a message can be displayed to the operator indicating that the calibration is completed (block 125) and then the touch screen 10 and display 15 may be used in an interactive session as indicated by block 130. If the angle $\theta_2$ is not reasonably close to 90°, a suitable error message can be displayed as indicated at block 135.

Thus, according to the present invention, an operator is required only to touch three areas on the touch screen 10 and the correspondence between the touch screen 1 and CRT 15 will be established for the manner in which that operator touches the screen 10. In addition, if the touch screen 10 and CRT 15 are severely misaligned, such misalignment will be detected and appropriate error messages can be displayed to inform the operator how to correct the problem. Furthermore, the invention is not limited to any particular touch screen or graphics display terminal or software and once implemented can be relatively easily adapted to different hardware and software packages.

The many features and advantages of the present invention are apparent from the detailed specification, and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described, accordingly, all suitable modifications and equivalents may be resorted to, falling within the scope and spirit of the invention.

What is claimed is:

1. An automatic calibration method for a touch screen used in conjuction with a display during interactive sessions, where the touch screen and the display have first and second sets of axes and the first and second sets of axes are asumed to substantially overlay, respectively, said method comprising the steps of:
   (a) displaying, prior to each of the interactive sessions, a first point on the display;
   (b) obtaining first coordinates of a first touch on the touch screen at approximately the first point; and
   (c) generating terms in a translation matrix for translating coordinates of the first touch into coordinates.

2. An automatic calibration method for a touch screen used in conjuction with a display during interactive sessions, the touch screen and the display have first and second se axes and the first and second sets of axes are asumed to substantially overlay, respectively, said method comprising the steps of:
   (a) displaying, prior to each of the interactive sessions, a first point on the display;
   (b) prompting a first touch at the first point;
   (c) obtaining first coordinates of the first touch on the touch screen at approximately the first point; and
   (d) generating terms in a translation matrix for traslating coordinates of the first touch into display coordinates.

3. A method as recited in claim 1,
   wherein the first point has X and Y display coordinates and the first coordinates of the first touch are X and touch coordinates, and
   wherein said step (c) comprises the steps of:
   (ci) generating an X coefficient equal to the X display coordinate divided by the X touch coordinate; and
   (cii) generating a Y coefficient equal to the Y display coordinate divided by the y touch coordinate.

4. An automatic calibration method for a touch screen used in conjunction with a display during interactive sessions, said method comprising the steps of:
   (a) displaying, prior to each of the interactive sessions, a first point on the display;
   (b) obtaining first coordinates of a first touch on the touch screen at approximately the first point;
   (c) displaying a second point on the display;
   (d) obtaining second coordinates of a second touch at approximately the second point; and
   (e) generating terms in a translation matrix for translating coordinates of the first touch into display coordinates in dependence upon the first and second coordinates.

5. A method as recited in claim 4,
   wherein the first point has x and Y display coordinates, the second point has origin display coordinates equal to (0, 0), the first coordinates of the first touch are X1 and Y1 touch coordinates and the second coordinates of the second touch are X0 and Y0 touch coordinates, and
   wherein step (c) comprises the following steps to generate four of the terms:
   (ci) generating an X coefficient equal to the X display coordinate divided by the X1 touch coordinate;
   (cii) generating an X intercept equal to the X0 touch coordinate;
   (ciii) generating a Y coefficient equal to the Y display coordinate divided by the Y1 touch coordinate; and
   (civ) generatign a Y intercept equal to the Y0 touch coordinate, so that any subsequent touch, having X and Y touch coordinates, on the touch screen during the interactive session can be translated into display coordinates by multiplying the X touch coordinate by the X coefficient and adding the X intercept and by multiplying the Y touch coordinate by the Y coefficient and adding the Y intercept.

6. A method as recited in claim 4,
   further comprising the steps of: (f) displaying a third point on the display; and
   (g) obtaining third coordinates of a third touch at approximately the third point, and
   wherein step (e) comprises generating the translation matrix in dependence upon the first, second and third coordinates.

7. A method as recited in claim 6, further comprising the steps of:
   (h) prompting the second touch at the second point prior to step (e); and
   (i) prompting the third touch at the third point prior to step (g).

8. A method as recited in claim 6, further comprising the step of:
   (h) comparing said first, second and third coordinates with a predetermined range of values; and
   (i) indicating an error if at least one of said first, second and third coordinates has a value which is outside of the predetermined range of values.

9. A method as recited in claim 6,
   wherein the first and second points define a first line and the second and third points define a second line substantially perpendicular to the first line, and
   wherein said method further comprises the steps of:
   (h) calculating an angle formed by a third line defined by the first and second coordinates and a fourth line defined by the second and third coordinates; and
   (i) indicating an error if the angle is smaller than 90° by a first predetermined value and if the angle is greater than 90° by a second predetermined value.

10. A method as recited in claim 9,
    wherein the first coordinates are X1, Y1, the second coordinattes are X0, Y0 and the third coordinates are X2, Y2, and
    wherein step (c) comprises the steps of:
    (ci) calculating a first distance D1 between the first and second touches as follows:

$$D1 = \sqrt{(X1 - X0)^2 + (Y1 - Y0)^2} \; ;$$

(cii) calculating a second distance D2 between the second and third touches as follows:

$$D2 = \sqrt{(X2 - X0)^2 + (Y2 - Y0)^2} \; ;$$

(civ) generating six terms of the coordinate translation matrix as follows:

$calib(0) = \cos \theta_1/D1$ $calib(1) = -\sin \theta_1/D1$ $calib(2) = -calib(0)*X0 + calib(1)*Y0$ $calib(3) = \sin\theta_1/D2$ $calib(4) = \cos\theta_1/D2$ $calib(5) = -calib(3)X0 - calib(4) \times Y0,$ so that any subsequent touch, having touch screen coordinates of $x_{ts}$ and $Y_{ts}$, can be translated into normalized coordinates of $X_N$ and $Y_N$ as follows:

$X_N = calib(0)*X_{ts} + calib(1)*Y_{ts} + calib(2)$ $Y_N = calib(3)*X_{ts} + calib(4)*Y_{ts} + calib(5)$ 11. A method as recited in claim 10,
wherein a third distance D3 is defined between the second and first points in terms of display coordinates, a fourth distance D4 is defined between the second and third points in terms of display coordinates and the second point has display coordinates of XD, YD, and
wherein step (c) further comprises the step of (cv) generating four additional terms of the coordinate translation matrix as follows:

$calib(6) = D3$ $calib(7) = D4$ $calib(8) = XD$ $calib(9) = YD,$ so that the normalized coordinates can be translated into graphic display coordinates Xgd and Ygd, as follows:

$X_{gd} = calib(6)*X_N + calib(8)$ $Y_{gd} = calib(7)*Y_N + calib(9).$

12. An automatic calibration method for a touch creen used in conjunction with a display by an perator during an interactive session, said method omprising the steps of:
 (a) prompting the operator to touch first point on the display when the interactive session begins;
 (b) obtaining first coordinates of a first touch on the touch screen at approximately the first point;
 (c) prompting the operator to touch a second point on the display after step (b);
 (d) obtaining second coordinates of a second touch at approximately the second point;
 (e) prompting the operator to touch a third point on the display after step (d);
 (f) obtaining third coordinates of a third touch at approximately the third point; and
 (g) generating terms in a translation matrix for translating subsequent touches on the touch screen into display coordinates in dependence upon the first, second and third coordinates.

13. A method as recited in claim 12, further comprising the step of:
 (h) comparing said first, second and third coordinates with a predetermined range of values; and
 (i) indicating an error if at least one of the first, second and third coordinates has a value which is outside of the predetermined range of values.

14. A method as recited in claim 12,
wherein the first and second points define a first line and the second and third points define a second line substantially perpendicular to the first line, and
wherein said method further comprises the steps of:
 (h) calculating an angle formed by a third line defined by the first and second coordinates and a fourth line defined by the second third coordinates; and
 (i) indicating an error if the angle is smaller than 90° by a first predetermined value and if the angle is greater than 90° by a second predetermined value.

15. A method as recited in claim 14,
wherein the first coordinates are X1, Y1, the second coordinates are X0, Y0 and the third coordinates are X2, Y2, and
wherein step (g) comprises the steps of:
 (gi) calculating a first distance D1 between the first and second touches as follows:

$$D1 = \sqrt{(X1 - X0)^2 + (Y1 - Y0)^2} \; ;$$

(gii) calculating a second distance D2 between the second and third touches as follows:

$$D2 = \sqrt{(X2 - X0)^2 + (Y2 - Y0)^2} \; ;$$

(giii) defining an angle $\theta_1$ as follows:
$\sin \theta_1 = (Y0 - Y1)/D1$
$\cos \theta_1 = (X1 - X0)/D1$; and (giv) generating six terms of the coordinate translation matrix as follows:

$calib(0) = \cos\theta_1/D1$ $calib(1) = -\sin\theta_1/D1$ $calib(2) = -calib(0)*X0 + calib(1)*Y0$ $calib(3) = \sin \theta_1/D2$ $calib(4) = \cos \theta_1/D2$ $calib(5) = calib(3)*X0 - calib(4) \times Y0,$ so that any subsequent touch, having touch screen coordinates of $X_{ts}$ and $Y_{ts}$, can be translated into normalized coordinates of $X_N$ and $Y_N$ as follows:

$X_N = calib(0)*Y_{ts} + calib(1)*Y_{ts} + calib(2)$ $Y_N = calib(3)*X_{ts} + calib(4)*Y_{ts} + calib(5).$ 16. A method as recited in claim 15,
where in a third distance D3 is defined between the second and first points in terms of display coordinates, a fourth distance D4 is defined between the second and third points in terms of display coordinates and the second point has display coordinates of XD, YD, and wherein step (c) further comprises the step of (cv) generating four additional terms of the coordinate translation matrix as follows:

calib(6)=D3 calib(7)=D4 calib(8)=XD calib(9)=YD, so that the normalized coordinates can be translated into graphic display coordinates $X_{gd}$ and $Y_{gd}$, as follows:

$$X_{gd}=calib(6)*X_N+calib(8)$$

$$X_{gd}=calib(7)*Y_N+calib(9).$$

17. An automatic calibration method for a touch screen used in conjunction with a display during interactive sessions, said method comprising the steps of:
  (a) displaying, prior to each of the interactive sessions, a first point on the display;
  (b) obtaining first coordinates of a first touch on the touch screen at approximately the first point;
  (c) comparing the first coordinates with a predetermined range of values;
  (d) indicating an error if said comparing step (c) determines that at least one of the first coordinates is outside of the predetermined range of values; and
  (e) generating terms in a translation matrix for translating coordinates of the first touch into display coordinates if said comparing step (c) determines that the first coordinates are within the predetermined range of values.

* * * * *